Figure 1:
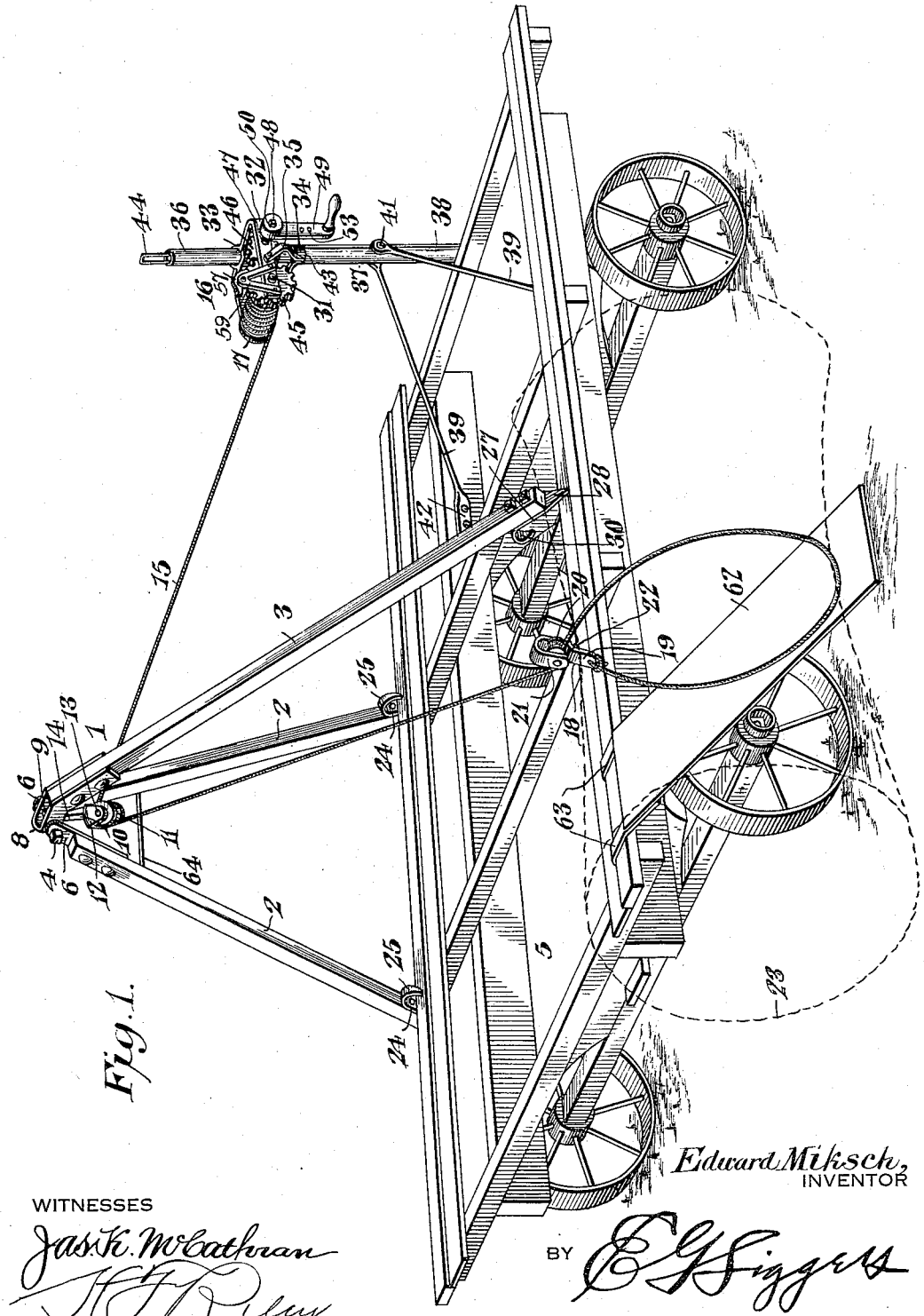

E. MIKSCH.
DERRICK FOR HAY WAGONS.
APPLICATION FILED NOV. 10, 1914.

1,165,015.

Patented Dec. 21, 1915.
2 SHEETS—SHEET 1.

WITNESSES
Jas. K. McCathran
H. J. Riley

Edward Miksch,
INVENTOR

BY E. G. Siggers
ATTORNEY

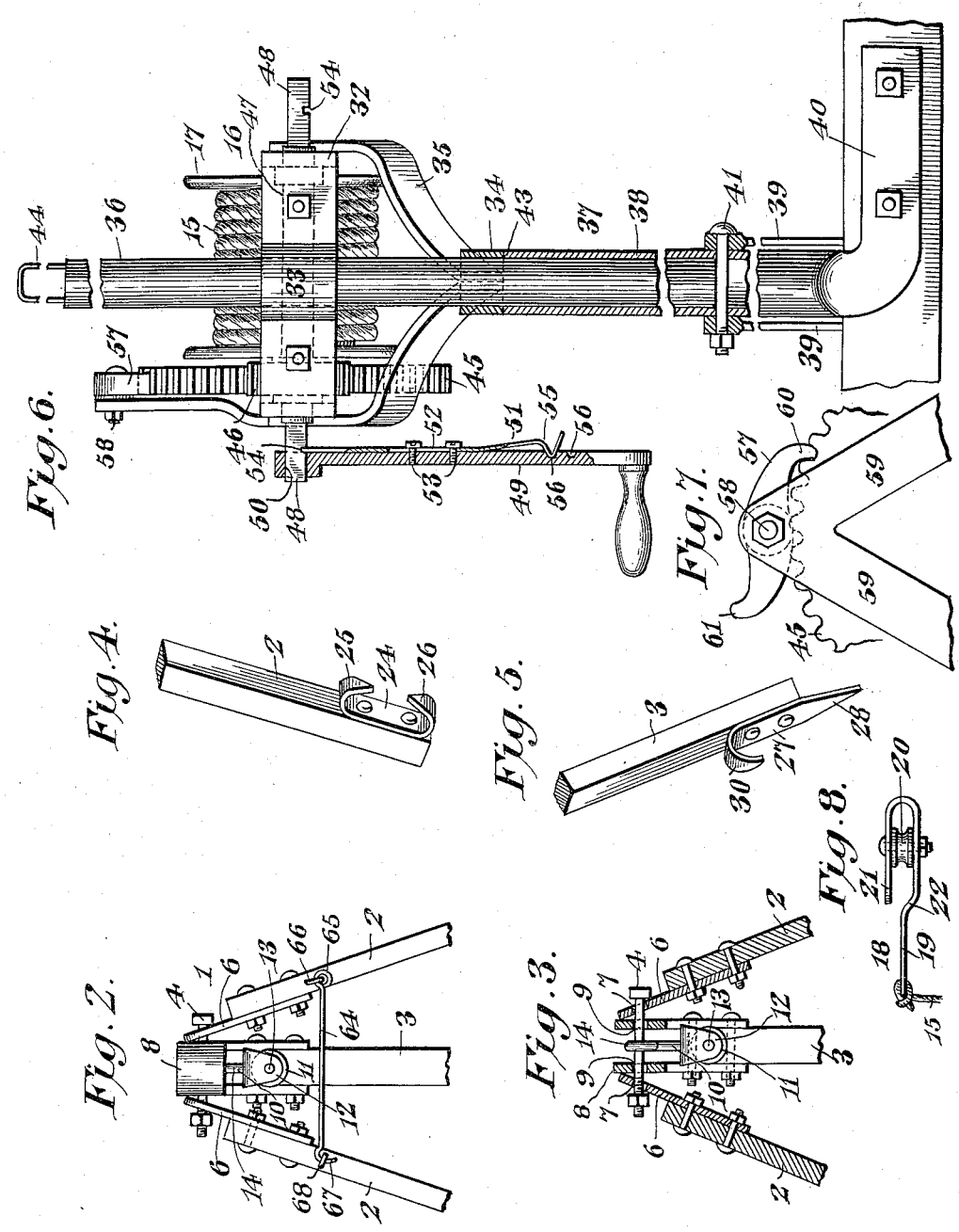

UNITED STATES PATENT OFFICE.

EDWARD MIKSCH, OF WASHINGTON, IOWA.

DERRICK FOR HAY-WAGONS.

1,165,015.   Specification of Letters Patent.   Patented Dec. 21, 1915.

Application filed November 10, 1914. Serial No. 871,330.

*To all whom it may concern:*

Be it known that I, EDWARD MIKSCH, a citizen of the United States, residing at Washington, in the county of Washington and State of Iowa, have invented a new and useful Derrick for Hay-Wagons, of which the following is a specification.

The invention relates to improvements in corn shock loaders.

The object of the present invention is to improve the construction of corn shock loaders and to provide a simple inexpensive, and efficient apparatus adapted to be readily mounted on a hay rack and capable of being quickly removed therefrom and compactly folded when not in use.

A further object of the invention is to provide a corn shock loader of this character adapted to permit corn shocks to be loaded upon a hay wagon from either side thereof and to be placed crosswise thereon so as to enable the stalks of corn to be easily spread over a field or unloaded upon a shreader or otherwise handled.

Another object of the invention is to provide a corn shock loader adapted to be adjusted longitudinally of a hay rack as the latter is filled or loaded and capable also of lateral adjustment to enable the shocks to be pulled over upon the hay rack the desired distance.

The invention also has for its object to equip the corn shock loader with a derrick adapted, when subjected to strain, to resist either upward, downward, or horizontal movement, whereby the derrick will be securely maintained in position and effectually prevented from slipping.

It is also an object of the invention to provide a corn shock loader with a pivotally mounted windlass adapted to swing horizontally to adjust itself automatically to any change in the position of the derrick and capable also of being readily detached from the hay wagon for use elsewhere or for any other purpose.

With these and other objects in view the invention consists of the construction and novel combination of parts hereinafter fully described, illustrated in the accompanying drawings, and pointed out in the claims hereto appended, it being understood that various changes in the form, proportion, size and minor details of construction, within the scope of the claims, may be resorted to without departing from the spirit or sacrificing any of the advantages of the invention.

In the drawings:— Figure 1 is a perspective view of a corn shock loader constructed in accordance with this invention and shown applied in position on a hay rack. Fig. 2 is a detail elevation of the upper portion of the derrick. Fig. 3 is a vertical sectional view of the same. Fig. 4 is a detail perspective view of the lower portion of one of the short legs or members of the derrick. Fig. 5 is a similar view of the lower portion of the long leg or member of the derrick. Fig. 6 is an elevation, partly in section, of the windlass. Fig. 7 is a detail view of a portion of the windlass, illustrating the arrangement of the pawl or dog. Fig. 8 is a detail view of the draw hook.

Like numerals of reference designate corresponding parts in all the figures of the drawings.

In the accompanying drawings, in which is illustrated the preferred embodiment of the invention, 1 designates a derrick comprising a pair of short inclined legs or members 2 and a relatively long inclined leg or member 3 connected at its upper end with the short legs or members by means of a horizontal pivot bolt 4 to form a foldable tripod or derrick frame. The short legs or members 2, which are oppositely inclined and which are located at one side of a hay rack 5, are provided at their upper ends with projecting arms 6 having registering perforations 7 to receive the pivot bolt 4 and preferably consisting of metallic strips or pieces bolted or otherwise secured to the inner opposed faces or edges of the legs or members 2. The other leg or member 3, which is mounted upon the hay rack at the opposite side thereof, is provided at its upper end with a projecting loop 8, consisting of spaced sides and a transverse connecting portion. The sides of the loop, which receive and embrace the upper end of the inclined leg or member 3, are bolted or otherwise secured to the same and are provided with perforations 9 through which passes the pivot bolt 4. The projecting loop spaces the legs or members from each other and also provides an open central space for the reception of a hanger 10 of a pulley 11, which is centrally suspended from the derrick. The pulley 11 consists of a sheave or wheel mounted in a casing 12 on a horizontal pivot 13. The hanger 10 is preferably swiveled to the casing of the pulley to permit free rotary movement thereof, and it has an eye 14 which loosely receives the pivot bolt 4, so that free play or movement of the pulley is afforded to enable a hoisting rope or cable 15 to extend freely toward a windlass 16.

The hoisting rope or cable 15, which is connected at one end to a spool 17 of the windlass 16, is equipped at its other end with a draw hook 18 having a shank portion 19 for the attachment of the rope or cable 15, and equipped with a grooved anti-friction wheel or pulley 20 mounted between the bill 21 of the hook and the opposite portion of the shank and adapted to permit a rope or cable to slide freely through the draw hook. The bill is extended a considerable distance beyond the grooved pulley or wheel, and the shank 18 is bent at an intermediate point at 22 to arrange the attaching portion of the shank in line with the center of the pulley, as clearly illustrated in Fig. 8 of the drawings. The draw hook detachably receives a portion of the rope or cable, which is looped to form a shock receiving bight or loop, and as the shock 23, illustrated in dotted lines in Fig. 1, is elevated, the loop or bight tightens and securely grips and holds the shock while it is being hoisted from the ground onto the hay rack 5.

The derrick is mounted upon the sides of the hay rack and the short legs or members 2 are equipped at their lower ends with double pointed hooks 24, each consisting of a straight connecting shank and upper and lower spaced bills 25 and 26, bent inwardly over the shank and spaced therefrom as clearly illustrated in Fig. 4 of the drawings. The hooks 24 are bolted or otherwise secured to the inner edges or faces of the legs or members 2 of the derrick, and the space between the downwardly and upwardly projecting points or bills is sufficient to permit the outer longitudinal bar of the side of the hay rack to enter between the engaging portions or bills. The upper engaging portions or bills 25 are adapted to rest upon the upper face of the engaged portion of the side of the hay rack, and should the strain on the rope or cable, incident to elevating a corn shock, tend to tilt the derrick, the lower engaging bills or points 26 of the hooks 24 will be carried into engagement with the lower face of the engaged portion of the hay rack and securely retain the derrick in proper position. The bills 25 and 26 of the hooks have sharp points and are adapted to partially embed themselves in the wood of the hay rack, whereby the derrick is prevented from accidentally slipping. As the space between the bills or engaging portions of the hooks 24 is greater than the thickness of the engaged portion of the side of the rack, the legs or members 2 are adapted to be readily adjusted or shifted along the rack as the same is filled. The long leg or member 3 is provided at its lower end with a double pointed hook 27, bolted or otherwise secured to the inner face of the leg or member 3 and provided with a straight downwardly projecting point or prong 28 and having at its upper end a downwardly curved engaging portion or bill 30, which is adapted to engage with one side of the hay rack similar to the upper bills 25 on the double hooks 24 of the short legs or members 2. The straight downwardly projecting point or prong, which is tapered, as clearly illustrated in Fig. 5 of the drawings, is adapted to engage the upper faces of the longitudinal bars of the hay rack and it permits a lateral adjustment of the derrick to arrange the pulley 11 at different points and thereby enable the shock to be drawn over upon the hay rack the desired distance. The derrick is first placed upon the rear portion of the hay rack, and as the hay rack is filled, the derrick is adjusted forwardly along the rack.

The spool 17 of the windlass is mounted on a transverse shaft 31 journaled in suitable bearings of a horizontally disposed approximately U-shaped frame 32 composed of spaced sides and a connecting transverse portion having a central loop 33 forming a vertical bearing and registering with a vertical bearing opening of a collar 34 of a brace 35. The brace 35 is composed of upwardly diverging sides bolted or otherwise secured to the sides of the U-shaped frame and preferably constructed of a single bar or piece of metal bent at the center to form the collar 34. The windlass is detachably mounted on an upper section 36 of a vertical standard 37 and composed of the said upper section 36 and the lower section 38, secured to the hay rack at the center of the front end thereof and supported in a vertical position by rearwardly diverging bracing rods 39. The lower section 38, which preferably consists of a pipe or tube, has its lower end bent at right angles and flattened to provide an attaching portion 40, which is bolted or otherwise secured to the hay rack. The bracing rods 39 are secured at their upper ends to the lower section 38 of the standard 37 by a transverse bolt 41, or other suitable fastening device, and the rear ends 42 of the bracing rods are secured to the hay rack at opposite sides thereof. The upper section 36 of the standard 37 preferably consists of a pipe or tube of less diameter than the lower section 38, in order to fit within the same, and the collar 34 of the brace 35 rests upon the shoulder formed by the upper end 43 of the lower section 38 of the standard 37. The upper section 36 of the standard 37 constitutes a pivot for the windlass and enables the latter to swing horizontally so as to extend in the direction of the pulley 11 in any adjustment of the derrick. The standard 36 is equipped at its upper end with a rein holder 44, adapted to receive the lines and preferably consisting of a piece of metal bent at opposite sides of the center into substantially U-shape and having its sides secured in the upper end of the section 36 of the standard.

The spool shaft 31 has keyed or otherwise secured to it a spur gear wheel 45 which meshes with a spur pinion 46 of a transverse counter-shaft 47 having extended squared terminals 48 adapted to receive a crank handle 49. The crank handle 49, which is provided with a rectangular opening 50, is adapted to be arranged on either end 48 of the shaft 47 to reverse the windlass when the derrick is reversed for hoisting the corn shocks at either side of the hay rack. The crank handle is detachably secured on the counter-shaft by means of a latch 51, consisting of a plate or piece of resilient material provided at a point intermediate of its ends with a slot 52 and secured to the inner face of the crank handle by screws 53 or other suitable fastening devices, passing through the slot 52 and slidably connecting the latch with the crank handle. The counter-shaft 47 is provided at its squared ends with notches 54, and the latch is engaged with the adjacent notch when the crank handle is placed on either end 48 of the counter-shaft 47. The outer portion of the latch is bent to form a laterally projecting approximately V-shaped portion 55, which is adapted to engage one or the other of a pair of notches 56 formed in the inner face of the crank handle 49, whereby the latch is maintained in or out of engagement with the shaft 47. The windlass is also equipped with a pawl or dog 57 mounted at a point intermediate of its ends on a horizontal pivot 58 carried by an intermediate extension 59 of the frame of the windlass. The pivot 58 extends inwardly from the supporting portion 59 of the frame, and the pivotally mounted pawl or dog is located above the gear wheel and has a downwardly curved engaging portion 60 adapted to lock the gear wheel and the spool against retrograde rotation. The curvature of the engaging portion of the pawl or dog also permits the gear wheel and the spool to be rotated forwardly in the operation of the corn shock loader. The other end 61 of the pawl or dog is curved upwardly and when thrown downwardly against the gear wheel, presents a convex face to the same and will not interfere with the rotary movement of the gear wheel in either direction. The extension 59 of the frame is preferably arched or V-shaped, as shown, but it may, of course, be of any preferred construction.

In order to prevent the corn shocks from catching on the edge of the hay rack, a skid 62 is preferably employed. The skid, which may be of any desired construction, is inclined and extends downwardly and outwardly from the side of the hay rack from which the corn shocks are loaded, and it is provided at its upper end with hooks 63 or other suitable means for engaging the side of the hay rack to maintain it in position. The derrick may be readily reversed to arrange the central leg or member 3 at either side of the hay rack. After the hay rack has been loaded, the derrick may be quickly removed and the pivotal connection of the legs or members permits the central leg or member 3 to fold between the side legs or members 2 to arrange the derrick compactly so that it may be stored in a comparatively small space. The pivotal connection also permits the short side legs or members 2 to swing inwardly from the position illustrated in Fig. 1 of the drawings, and in order to prevent the said legs or members 2 from accidentally moving inwardly when the derrick is in use, they are locked in proper spaced relation by means of a rod 64, provided at one end with an eye 65 which is linked into the eye 66 of one of the legs or members 2. The rod 64 is provided at its other end with a hook 67 which is engaged with an eye 68 of the other side leg or member 2. When the hook 67 of the rod 64 is engaged with the eye 68 the side legs or members 2 are securely held in proper position and prevented from accidentally collapsing. As the windlass is readily detachable, it may be removed from the hay rack to permit the latter to be placed under a low shed, and by making the windlass removable, it may also be used for a variety of purposes about a farm.

What is claimed is:—

1. An apparatus of the class described including a derrick designed to be mounted upon a hay rack and composed of legs or members and provided with spaced upper and lower engaging portions arranged to hold the derrick against upward or downward movement, the space between the engaging portions permitting an adjustment of the derrick to change the position thereof.

2. An apparatus of the class described including a derrick designed to be mounted upon a hay rack and composed of legs or members and provided with a double hook consisting of spaced upper and lower bills and a connecting shank, the bills being adapted to engage a hay rack or other part at the upper and lower faces thereof, and the space between the bills permitting an adjustment of the derrick to change the position thereof.

3. An apparatus of the class described including a derrick designed to be mounted upon a hay rack and composed of legs or members and provided with a hook having a straight downwardly projecting prong and an upper downwardly extending bill, the bill being adapted to engage the side of a hay rack and permit a longitudinal adjustment of the derrick, and the prong being adapted to engage the upper face of the hay rack and permitting either a longitudinal or lateral adjustment of the derrick.

4. An apparatus of the class described including a derrick adapted to be placed upon a hay rack and composed of a pair of legs or members arranged at one side of the hay rack, and a central leg or member located at the other side of the hay rack and pivotally connected at its upper end with the said legs or members, double hooks secured to the lower ends of the said pair of legs or members and having upper and lower bills for engaging the side of the hay rack from above or beneath, and a single hook secured to the lower end of the central leg or member and having at its lower end a downwardly projecting prong and provided at its upper end with a downwardly extending bill.

5. An apparatus of the class described including a derrick composed of inclined legs or members and adapted to be mounted on a hay rack and adjustable thereon, a pulley supported by the derrick, a rope or cable passing over the pulley, and a movably mounted windlass frame connected with the rope or cable and adjustable automatically to conform to the adjustment of the derrick.

6. An apparatus of the class described including an adjustable derrick adapted to be mounted on a hay rack and to be moved to different positions thereon, a pulley supported by the derrick, a rope or cable passing over the pulley, and a horizontally swinging windlass connected with the rope or cable and adjustable automatically to conform to the adjustment of the derrick.

7. An apparatus of the class described including a derrick adapted to be mounted on a hay rack and composed of side and central legs or members, said derrick being reversible to arrange the central leg or member at either side of the hay rack, a pulley supported by the derrick, a rope or cable passing over the pulley, a windlass provided with an operating shaft extending from opposite sides of the windlass, and a reversible handle provided with means for securing it to either end of the operating shaft to enable it to be reversed with the derrick.

8. An apparatus of the class described including a derrick adapted to be mounted on a hay rack and composed of central and side legs or members, said derrick being adjustable longitudinally and laterally of the hay rack and reversible to arrange the central leg or member at either side of the same, a pulley supported by the derrick, a rope or cable passing over the pulley, a vertical pivot carried by the hay rack, a horizontally swinging windlass mounted on the vertical pivot and connected with the rope or cable, said windlass being provided with an operating shaft extending from opposite sides thereof, and an operating device provided with means for mounting it on either end of the operating shaft.

9. An apparatus of the class described including a derrick having a pulley and adapted to be mounted on a hay rack, a vertical standard composed of a lower tubular section mounted on the hay rack, an upper removable section fitted in the lower tubular section and constituting a pivot, a horizontally swinging windlass pivoted to the standard by the upper section thereof, and a rope or cable passing over the pulley and connected with the windlass.

10. An apparatus of the class described including an adjustable derrick adapted to be arranged upon a hay rack, a tubular standard also mounted upon the hay rack and having an upper pivot portion, a horizontally swinging windlass mounted on the pivot portion of the standard, a pulley supported by the derrick, and a rope or cable passing over the pulley and connected with the windlass.

In testimony, that I claim the foregoing as my own, I have hereto affixed my signature in the presence of two witnesses.

EDWARD MIKSCH.

Witnesses:
James L. Brookhart,
Smith W. Brookhart.